US005714096A

United States Patent [19]

Dorfman

[11] Patent Number: 5,714,096
[45] Date of Patent: Feb. 3, 1998

[54] POSITIVE TEMPERATURE COEFFICIENT COMPOSITION

[75] Inventor: Jay Robert Dorfman, Durham, N.C.

[73] Assignee: E. I. Du Pont de Nemours and Company, Wilmington, Del.

[21] Appl. No.: 707,034

[22] Filed: Sep. 3, 1996

Related U.S. Application Data

[63] Continuation-in-part of Ser. No. 401,536, Mar. 10, 1995, abandoned.

[51] Int. Cl.[6] .............. H01B 1/24; B32B 9/00; C08L 51/00

[52] U.S. Cl. .............. 252/511; 524/531; 525/285; 525/327.4; 525/356; 428/221; 106/472

[58] Field of Search .............. 252/511; 524/531; 525/285, 327.4, 334.1, 356; 428/221; 106/472

[56] References Cited

U.S. PATENT DOCUMENTS

| | | | |
|---|---|---|---|
| 2,715,668 | 8/1955 | Booker et al. | 219/19 |
| 3,287,684 | 11/1966 | Armbruster | 338/211 |
| 3,457,537 | 7/1969 | Hines | 338/162 |
| 3,793,716 | 2/1974 | Smith-Johannsen | 29/611 |
| 3,878,362 | 4/1975 | Stinger | 219/528 |
| 4,071,736 | 1/1978 | Kamerling | 219/219 |
| 4,124,747 | 11/1978 | Murer et al. | 429/210 |
| 4,237,441 | 12/1980 | Van Konynenburg et al. | 338/22 R |
| 4,388,607 | 6/1983 | Toy et al. | 338/22 SD |
| 4,400,614 | 8/1983 | Sopory | 219/528 |
| 4,426,633 | 1/1984 | Taylor | 338/25 |
| 4,534,889 | 8/1985 | Van Konynenburg et al. | 252/511 |
| 4,560,498 | 12/1985 | Horsma et al. | 252/511 |
| 4,560,524 | 12/1985 | Smuckler | 264/105 |
| 4,591,700 | 5/1986 | Sopory | 219/505 |
| 4,658,121 | 4/1987 | Horsma et al. | 252/511 |
| 4,727,417 | 2/1988 | Kanno et al. | 358/98 |
| 4,755,553 | 7/1988 | Kishimura et al. | 524/531 |
| 4,761,541 | 8/1988 | Batliwalla et al. | 219/528 |
| 4,774,024 | 9/1988 | Deep et al. | 252/511 |
| 4,775,778 | 10/1988 | Van Konynenburg et al. | 219/549 |
| 4,777,351 | 10/1988 | Batliwalla et al. | 219/528 |
| 4,818,439 | 4/1989 | Blackledge et al. | 252/511 |
| 4,857,880 | 8/1989 | Au et al. | 338/22 R |
| 4,935,156 | 6/1990 | Van Konynenburg et al. | 219/553 |
| 5,093,036 | 3/1992 | Shafe et al. | 252/511 |
| 5,174,924 | 12/1992 | Yamada et al. | 252/511 |
| 5,181,006 | 1/1993 | Shafe et al. | 338/22 R |
| 5,198,639 | 3/1993 | Smuckler | 219/219 |
| 5,206,482 | 4/1993 | Smuckler | 219/219 |
| 5,298,721 | 3/1994 | Smuckler | 219/505 |
| 5,378,407 | 1/1995 | Chandler et al. | 252/513 |

FOREIGN PATENT DOCUMENTS

| | | |
|---|---|---|
| 0 038 718 | 10/1981 | European Pat. Off. . |
| 1 604 735 | 12/1981 | United Kingdom . |

OTHER PUBLICATIONS

Patent Abstracts of Japan, vol. 013, No. 352 (E-801), 8 Aug. 1989, & JP 01 112686 A (Matsushita Electric Ind. Co. Ltd.), 1 May 1989.

Patent Abstracts of Japan, vol. 007, No. 056 (C-155), 8 Mar. 1983 & JP 57 205462 A (Sumitomo Kinzoku Kouzan KK), 16 Dec. 1982.

Patent Abstracts of Japan, vol. 015, No. 423 (E-1127), 28 Oct. 1991 & JP 03 176980 A (Matsushita Electric Ind. Co Ltd.), 31 Jul. 1991.

Database WPI, Week 8836 Derwent Publications Ltd., London, GB; AN 88-253707—XP002028751 & JP 63 184 303 A (Nippon Mectron KK), 29 Jul. 1988.

*Primary Examiner*—Douglas J. McGinty
*Assistant Examiner*—Mark Kopec

[57] ABSTRACT

The present invention is directed to a positive temperature coefficient composition comprising by weight based on total composition, 10–30% carbon black possessing a DBP absorption of about 125 cc/100 g carbon black or less; 10–40% chlorinated, maleic anhydride grafted, polypropylene resin; and organic medium capable of solubilizing the resin.

2 Claims, No Drawings

POSITIVE TEMPERATURE COEFFICIENT COMPOSITION

CROSS REFERENCE TO RELATED APPLICATIONS

This application is a continuation-in-part of U.S. application Ser. No. 08/401,536 filed Mar. 10, 1995 now abandoned.

FIELD OF THE INVENTION

This invention is directed to a positive temperature coefficient composition and in particular relates to such compositions which are suitable for automotive mirror heaters.

BACKGROUND OF THE INVENTION

It is well known in the art that the electrical properties of conductive polymers frequently depend upon, inter alia, their temperature; and that a very small proportion of conductive polymers exhibit what is known as PTC positive temperature coefficient behavior, i.e., a rapid increase in resistivity at a particular temperature or over a particular temperature range. The term "switching temperature" (Ts) is used to denote the temperature at which the rapid increase takes place. When the increase takes place over a temperature range (as is often the case) then Ts can conveniently be designated as the temperature at which extensions of the substantially straight portions of the plot of the log of the resistance against the temperature (above and below the range) cross. The resistance of PTC polymers continues to increase as the temperature rises above Ts until it reaches a maximum, called the Peak Resistance, at a temperature which is called the Peak Temperature; the resistance thereafter decreases more or less rapidly.

Materials exhibiting PTC behavior are useful in a number of applications in which the size of the current passing through a circuit is controlled by the temperature of a PTC element forming part of that circuit. For practical purposes this means that the Ts of the material should lie between about −100° C. and about 250° C. and that the volume resistivity of the material at temperatures below Ts should be from about 2.5 to about $10^5$ ohm cm. The lower limit on resistivity results from the requirement that, at temperatures above Ts the PTC element should be an insulator; if the resistivity of the element below Ts is less than 2.5 ohm cm., then even after the increase in resistivity around and above Ts the resistivity will not be sufficiently high. The upper limit on resistivity results from the requirement that the PTC element should be a conductor at temperatures below Ts. The practical effect of these limitations on resistivity is to exclude from consideration conductive polymers having either very high or very low loadings of conductive filler. Another practical requirement for PTC materials is that the increase in resistance above Ts should be sufficiently high that the heater (or other device) is effectively converted from an electrical conductor to an electrical insulator by a relatively limited increase in temperature. A convenient expression of this requirement is that the material should have an $R_{14}$ value of at least 2.0 or an $R_{100}$ value of at least 6, and preferably an $R_{30}$ value of at least 4, where $R_{14}$ is the ratio of the resistivities at the end and beginning of the 14° C. range showing the sharpest increase in resistivity; $R_{100}$ is the ratio of resistivities at the end and beginning of the 100° C. range showing the sharpest increase in resistivity; and $R_{30}$ is the ratio of the resistivities at the end and beginning of the 30° C. range showing the sharpest increase in resistivity. A further practical requirement for most PTC materials is that they should continue to exhibit useful PTC behavior, with Ts remaining substantially unchanged, when repeatedly subjected to thermal cycling which comprises heating the material from a temperature below Ts to a temperature above Ts but below the peak temperature, followed by cooling to a temperature below Ts. It is also preferred that the ratio of the peak resistance to the resistance at Ts should be at least 10:1. From the above one can see that property requirements are achieved by careful selection of fillers and polymer in order to obtain a useful PTC composition. The present invention will reduce material costs and extend battery life in consumer products such as automotive mirror heaters.

PRIOR ART

Conductive polymer compositions which exhibit PTC behavior and electrical devices comprising them are well known. Reference may be made, for example to U.S. Pat. Nos.: 5,206,482 Smuckler, 5,181,006 Shafe et al., 5,174,924 Yamada et al., 5,093,036 Shafe et al., 4,935,156 van Konynenburg et al., 4,818,439 Blackledge et al., 4,591,700 Sopory, 4,560,524 Smuckler, 4,426,633 Taylor, 4,400,614 Sopory, 4,388,607 Toy et al., 4,237,441 van Konynenburg et al., 4,124,747 Murer et al., and J. Meyer in Polymer Engineering and Science, November 1973, No. 6, pages 462–468.

The above patents require a crystalline or semi-crystalline polymer, not an amorphous polymer like the polymer of the present invention. The crystalline character is taught in the art to be important for the self-regulating aspects of the PTC compositions. That is, the crystalline melt temperature affects the switching temperature and the temperature range in which the PTC properties are exhibited.

Further reference is made to U.S. Pat. Nos.: 4,857,880 Au et al., 4,775,778 van Konynenburg et al., 4,727,417 Au et al., 4,658,121 Horsma et al., 4,560,498 Horsma et al., 4,534,889 van Konynenburg et al., and GB 1,604,735 Raychem Corporation.

This group of patents require a cross-linked polymer, not an uncrosslinked polymer like the polymer of the present invention. The group teaches that cross-linking is necessary to increase the stability of the polymer in the critical "hot zone", i.e., the temperature range in which the PTC behavior is exhibited.

U.S. Pat. No. 5,198,639 to Smuckler and U.S. Pat. No. 4,774,024to Deep et al. disclose a composition containing "a polymer matrix" and "a polymeric component", respectively. In addition to the polymer component and a conductive filler, both patents require additional materials which are not solvents and which remain in the PTC composition. Smuckler requires, in the final PTC composition, a polymer-miscible monomeric crystallizable organic compound having a characteristic crystalline melt temperature below about 150° F., the compound being selected from the group consisting of saturated hydrocarbons, organic acids, and alcohols. The final PTC composition that results after drying of the proposed formulation does not contain the monomeric organic compound disclosed in the present invention or any equivalent crystallinity. Deep requires the additional components of an arc-controlling agent and a lubricant or coupling agent comprising an organo-silicon compound, a stearate or a titanate. Neither of these components is found in the present invention's composition.

U.S. Pat. No. 4,755,553 to Kishimura et al. discloses a primer composition with 1–100 parts by weight chlorinated carboxyl groups containing α-olefin polymer and 100 parts by weight solvent. In addition, carbon black is used as an organic pigment in the amount of about 0.01 to about 10% by weight. The different types of carbon are never distinguished. There is no teaching in Kishimura of using the disclosed invention as a composition for PTC application. In fact, as evidenced by Applicants experiments, it is shown that even the preferred black at a loading of less than 10% exhibits extremely poor if not zero PTC effect.

SUMMARY OF THE INVENTION

The present invention is directed to a positive temperature coefficient composition comprising, by weight, based on total composition, 10–30% carbon black possessing a DBP absorption of about 125 cc/100 g carbon black or less; 10–40% chlorinated, maleic anhydride grafted, polypropylene resin; and organic medium capable of solubilizing the resin.

The present invention is further directed to a sheet comprising a cast layer of the novel positive temperature coefficient composition from above which has been heated to remove volatile organic solvent.

The present invention is still further directed to a self-regulating heated mirror assembly which comprises a reflective mirror, the novel composition of the present invention, and spaced electrodes connected to a source of electrical power to pass current between electrodes.

DETAILED DESCRIPTION OF THE INVENTION

I. Conductive Phase

The composition contains electrical conductive fillers such as carbon black, graphite and the like in a filler to binder weight ratio of about 50/100 to 300/100 or 10–30 wt. % and a preferred range of 15–20 wt. % based on total composition to provide an electrically conductive film. The preferred particulate filler is carbon black. The preferred blacks for many devices of the present invention, especially self-limiting heaters, are blacks having a low structure. Low structure carbon blacks consist of small primary aggregates allowing close packaging; high structure carbon blacks generally are more conductive and import higher viscosity in solution. A common test used to quantify low structure is the absorption of dibutyl phthalate (DBP) oil, measured in cc's of oil absorbed per 100 grams of carbon black. Therefore, carbon blacks possess a DBP absorption of about 125 cc/100 g carbon black or less. Carbon blacks preferred are those like Cabot Monarch 120 which has a DBP of 72. A 25 micron thick film of the composition in its dried state has an electrical resistance of about 1–50 kohms and preferably 5–20 kohms. The type of black selected will influence the resistivity/temperature characteristics of the composition. Other types of carbon blacks for use in this invention are furnace and acetylene blacks but the less conductive thermal and channel process blacks can also be used. Conductive fillers such as silver may also be utilized.

II. Polymer

Characteristics of the polymer layer is that the polymer be substantially non-crystalline and non-crosslinked in nature. As used herein, the term "non-crystalline" refers to polymers having no more than about 0% crystallinity as determined by X-ray diffraction. About 10–40 wt. % polymer based on total composition is present in the instant invention. The preferred polymer of this invention is HYPALON® CP 826 manufactured by E.I. du Pont de Nemours and Company, Wilmington, Del., but any chlorinated, maleic anhydride grafted, polypropylene resin may be used. In addition to the polymer being added to form the initial composition, 2–20 wt % additional HYPALON® medium (HYPALON® dissolved in a solvent) may be added to the composition to bring the resistivity value up to a level which will satisfy the needs of the heated mirror design. For example, if 4 ohms is the desired starting resistance of a mirror circuit and the dimensions are 5 inches by 15 inches, then only a certain resistivity value of the PTC carbon will satisfy these requirements. Balanced with that, is the desire to have a certain level of PTC activity, i.e., how quickly it will "shut off" or self-thermostat. The higher the resistivity, the higher the TCR. Thus, the more potent the PTC effect. The preferred ratio of the HYPALON® to solvent in the HYPALON® medium is 20/80 but the HYPALON® component may be in the range of 10–40.

III. Organic Medium

The inorganic particles are mixed with an essentially inert liquid medium (vehicle) by mechanical mixing. This mixture is then subjected to a three roll mill to assure proper dispersion of the particles to form a paste-like composition having suitable consistency and rheology for screen printing. The latter is printed as a "thick film" on conventional dielectric substrates in the conventional manner.

Any organic, inert liquid may be used as the solvent for the vehicle so long as the polymer is fully solubilized. Solubilize herein is defined as the extent to which a substance mixes with a liquid to produce a homogeneous system or solution. Various organic liquids, with or without thickening and/or stabilizing agents and/or other common additives, may be used as the vehicle. Exemplary of organic liquids which can be used are dibutyl carbitol, for example, or beta-terpineol.

EXAMPLES

Compositions, Temperature Coefficient of Resistance (TCR) values, and Resistivity for the Examples hereinbelow are summarized in Table 1.

Example 1

20.0 grams of HYPALON® 826 resin (chlorinated, maleic anhyride grafted, polypropylene resin available from E.I. du Pont de Nemours and Company) was dissolved in 80.0 grams of a 50/50 (wt.) mixture of Dibutyl Carbitol/Beta-Terpineol. The mixture was heated at approximately 80° C. for 3 hours with a light yellow homogenous solution resulting. The solution was cooled for approximately 1 hour. At this time, 20.0 grams of MONARCH 120 carbon powder (available from Cabot Corporation) was added to 80.0 grams of the above HYPALON® solution and mixed for 30 minutes. This mixture was subjected to one cycle on the three roll-mill at a pressure of 200 PSI. Ten grams of the above resistive paste was used for all subsequent work.

The resulting thick film resistive ink was applied to a 5 mil thick polyester substrate (MYLAR® available from E.I du Pont de Nemours and Company) by the screen printing process. After printing a highly conductive polymer thick film conductor suitable for use on polyester substrates such as 5025, it was cured in an oven at 130° C. for 5 minutes. Subsequently, the resistive paste was printed over the edges of the silver ink and cured at 130° C. for 5 minutes. Test parts were printed to measure the resistance/resistivity of the carbon paste at 25° C. and 125° C. Initial resistivity values (25° C.) were 0.95 Kohm/sq (Acceptable Kohm/sq. are within the range of approx. 1 Kohm/sq. to 60 Kohm/sq.) while TCR values at 125° C. were 22500 ppm/C. Typical TCR values for carbon inks that do not exhibit PTC effect are HTCR's below 6000, although a marginal PTC effect is seen as 6000 is approached. Commercially acceptable HTCR's are about 20,000 or greater. A value of 22500 indicates significant increase in resistance at the higher temperature as compared with the resistance at 25° C.

Example 2

The same conditions were used as per Example 1. To 10 grams of ink of Example 1, 1.0 grams of HYPALON®-based medium was added, wherein the HYPALON® to solvent is in a ratio of 20/80. The mixture was mixed for 10 minutes, and tested per the above. Initial resistivity values for this example were 2.1 K ohm/sq while the TCR values at 125° C. (reference temperature=25° C.) were 42800.

Example 3

The same conditions were used as per Example 1. Here, 3.0 grams of the HYPALON®-based medium was added to the paste from Example 1, wherein the HYPALON® to solvent is in a ratio of 20/80. The mixture was mixed for 10 minutes, and tested per the above. Initial resistivity values were 8.1 K ohm/sq while the TCR values at 125° C. (reference temperature=25° C.) were 68900.

Example 4

20.0 grams of a Polyester resin (Goodyear Vitel-200) was dissolved in 80.0 grams of DBE-9 solvent (available from E.I. du Pont de Nemours and Company). The mixture was stirred/heated to 80° C. for several hours at which time a homogeneous solution results. 20.0 grams of MONARCH 120 Carbon (available from Cabot Corporation) was then added to 80.0 grams of the Polyester-based solution and then processed as per Example 1. Resistivity values of parts made with this paste were 0.53 K ohms/sq. TCR values at 125° C. (reference temperature=25° C.) were 5317, indicating no PTC effect.

Example 5

The same conditions were used as per Example 1. Here, Sanyo 822S chlorinated polypropylene (sold through Philip Brothers Chemical Co., 74 Mt. Paran Road, Atlanta, Ga. 30327) was used instead of the HYPALON® 826 resin. Initial resistivity values were 1.37 K while HTCR values were 15190. Clearly PTC activity exists.

Example 6

The same conditions were used as per Example 1. Eastman Chemical CP-343-1 resin (Eastman Chemicals, Kingsport, Tenn.) was used instead of the HYPALON® 826. Initial resistivity values were 1.67 K while HTCR values were 22690. Again, PTC activity clearly exists.

A summary of the Examples 1–8 is presented in Table 1 hereinbelow.

Example 7

The same conditions were used as per Example 1. Eastman Chemical CP-343-1 resin was used. Initial resistivity values were 7750 K while HTCR values were 9585, indicating slight PTC effect.

Example 8

The same conditions were used as per Example 1. Eastman Chemical CP-343-1 resin was used. Initial resistivity values were 0 K and HTCR was also 0, indicating no PTC effect.

TABLE 1

| | Example 1 | Example 2 | Example 3 | Example 4 | Example 5 | Example 6 | Example 7 | Example 8 |
|---|---|---|---|---|---|---|---|---|
| HYPALON ® | 16% | 14.5% | 12.3% | | | | | |
| Sanyo 822S | | | | | 16% | | | |
| Eastman Chemical | | | | | | 16% | 20.93% | 21.85% |
| Dibutyl Carbitol/Beta Terpineol | 64% | 58.2% | 49.2% | 64% | 64% | 64% | | |
| Dibutyl Carbitol/Terpineol | | | | | | | 70.07% | 73.15% |
| Polyester resin | | | | 16% | | | | |
| MONARCH 120 carbon powder | 20% | 18.2% | 15.4% | 20% | 20% | 20% | 9% | 5% |
| HYPALON ®-based medium (Addition) | — | 9.1% | 23.1% | — | | | | |
| Resistivity @ 25° C. | 0.95 Kohm/sq | 2.1 Kohm/sq | 8.1 Kohm/sq | .53 Kohm/sq | 1.37 Kohm/sq | 1.67 Kohm/sq | 7750 Kohm/sq | 0 Kohm/sq |
| TCR @ 125° C. | 22500 ppm/C | 42800 ppm/C | 78900 ppm/C | 5317 ppm/C | 15190 ppm/C | 22690 ppm/C | 9585 ppm/c | 0 ppm/c |

What is claimed is:

1. A positive temperature coefficient composition comprising, by weight, based on total composition, 15–30% carbon black possessing a DBP absorption of about 125 cc/100 g carbon black or less;

10–40% chlorinated, maleic anhydride grafted, polypropylene resin; and organic medium capable of solubilizing the resin.

2. A sheet comprising a cast layer of a composition of claim 1 wherein the composition has been heated to remove volatile organic medium.

* * * * *

UNITED STATES PATENT AND TRADEMARK OFFICE

CERTIFICATE OF CORRECTION

PATENT NO. : 5,714,096
DATED : February 3, 1998
INVENTOR(S) : Jay Robert Dorfman It is certified that error appears in the above-identified patent and that said Letters Patent is hereby corrected as shown below:

Claim,
Line 59, delete "40" and substitute -- 60 -- therefor.

Signed and Sealed this

Twenty-first Day of August, 2001

*Attest:*

NICHOLAS P. GODICI

*Attesting Officer* *Acting Director of the United States Patent and Trademark Office*